(12) United States Patent
Karner et al.

(10) Patent No.: US 7,895,478 B2
(45) Date of Patent: Feb. 22, 2011

(54) METHOD AND DEVICE FOR MONITORING A PROCESS EXECUTION

(75) Inventors: Ruediger Karner, Kornwestheim (DE); Alexander Jansen, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 178 days.

(21) Appl. No.: 11/885,294

(22) PCT Filed: Dec. 30, 2005

(86) PCT No.: PCT/EP2006/057233

§ 371 (c)(1),
(2), (4) Date: Jul. 17, 2009

(87) PCT Pub. No.: WO2006/092182

PCT Pub. Date: Sep. 8, 2006

(65) Prior Publication Data

US 2009/0300435 A1    Dec. 3, 2009

(30) Foreign Application Priority Data

Feb. 28, 2005  (DE) .................. 10 2005 008 975

(51) Int. Cl.
   G06F 11/00  (2006.01)
(52) U.S. Cl. ............... 714/55; 714/10; 702/125; 700/1
(58) Field of Classification Search ............. 714/55, 714/15, 10–13; 702/125; 700/1; 701/29, 701/45

See application file for complete search history.

(56) References Cited

U.S. PATENT DOCUMENTS

| 3,723,975 A * | 3/1973 | Kurtz et al. .................. 714/55 |
| 4,410,938 A * | 10/1983 | Higashiyama ............... 714/47 |
| 4,748,587 A * | 5/1988 | Combes et al. ............... 714/55 |
| 5,148,378 A * | 9/1992 | Shibayama et al. ......... 702/116 |
| 5,359,515 A | 10/1994 | Weller et al. |
| 5,363,303 A * | 11/1994 | Kaneko et al. ............... 701/45 |
| 5,602,736 A * | 2/1997 | Toya et al. ................... 701/45 |
| 5,677,838 A | 10/1997 | Itou et al. |
| 5,848,366 A * | 12/1998 | Ueda ............................ 701/36 |
| 5,908,470 A * | 6/1999 | Stonecypher, Jr. .......... 713/502 |
| 5,938,708 A * | 8/1999 | Wallace et al. ............... 701/48 |
| 5,983,143 A * | 11/1999 | De Wille ....................... 701/1 |
| 6,219,598 B1 * | 4/2001 | Miwa et al. .................. 701/36 |
| 6,543,003 B1 * | 4/2003 | Floyd et al. .................. 714/10 |
| 6,823,515 B2 * | 11/2004 | LiVecchi .................... 718/105 |
| 6,898,493 B2 * | 5/2005 | Ehrman et al. ............... 701/35 |
| 7,207,043 B2 * | 4/2007 | Blythe et al. ................ 718/104 |
| 7,310,751 B2 * | 12/2007 | Tayler et al. ................. 714/55 |
| 2002/0124212 A1 * | 9/2002 | Nitschke et al. ............. 714/55 |
| 2004/0078731 A1 * | 4/2004 | Becher et al. ................ 714/55 |

FOREIGN PATENT DOCUMENTS

| EP | 0 663 324 | 7/1995 |
| EP | 663324 A1 * | 7/1995 |

* cited by examiner

*Primary Examiner*—Yolanda L Wilson
(74) *Attorney, Agent, or Firm*—Kenyon & Kenyon LLP (57) ABSTRACT

A method for monitoring a process execution of a plurality of sequentially executed processes starts one of a plurality of timers in cyclic permutation when one of the processes is started, and outputs a first error signal when a period of time recorded by one of the timers exceeds a predefined maximum period of time.

21 Claims, 5 Drawing Sheets

METHOD AND DEVICE FOR MONITORING A PROCESS EXECUTION

The present invention relates to a method for monitoring a process execution and to a device for implementing the method according to the present invention.

BACKGROUND INFORMATION

Numerous control methods and their corresponding devices provide for regularly recording signals from sensors, for analyzing the recorded signals, and for generating appropriate control signals in response to the analysis. An example is a control system for triggering airbags which regularly executes a process that includes the following incremental steps: recording the signals from sensors, processing the signals, and generating a control signal for the airbag.

A malfunction of the real-time system or of the executed processes can lead to a triggering of the airbag. This is prevented in that the real-time system monitors the execution of the processes and, in response to detection of a malfunction, an outputting of a control signal to the airbag is blocked.

Figure 8:
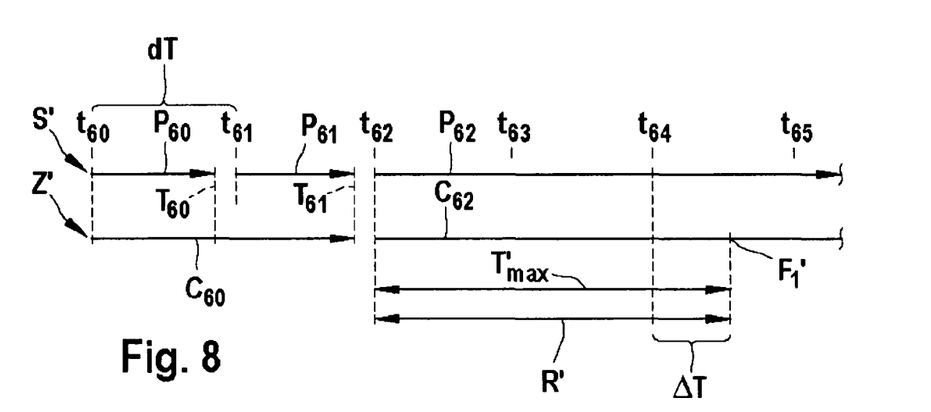
FIG. 8 shows a flow diagram for clarifying the problem definition underlying the method according to the present invention.
Figure 9:
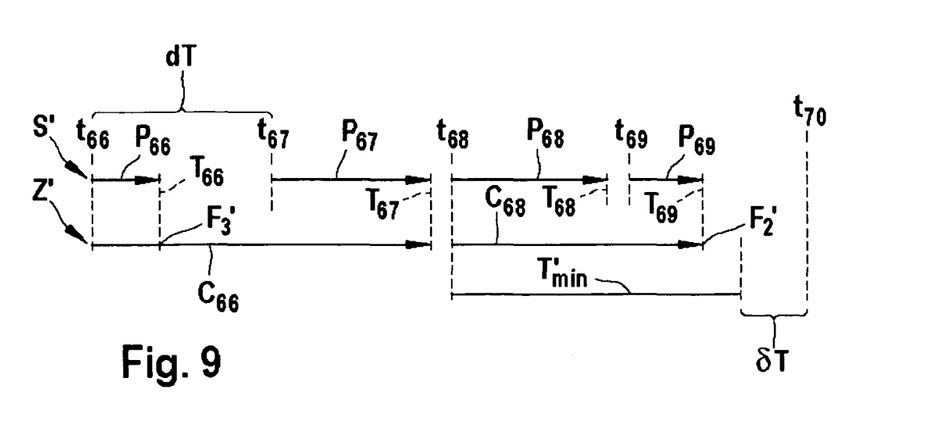
FIG. 9 shows another flow diagram for clarifying the problem definition underlying the method according to the present invention.

A method for clarifying a problem definition of the exemplary embodiment and/or exemplary method of the present invention is shown in FIG. 8. Processes $P_{60}$, $P_{61}$, $P_{62}$ are started by a real-time system S' in accordance with the time-slot pattern at points in time $t_{61}$, $t_{62}$ at time interval dT. Two processes $P_{60}$, $P_{61}$ are combined into pairs, respectively, and, in response to the starting of first process $P_{60}$ of the two processes, a counter Z' is started, and, in response to the ending of second process $P_{61}$, counter Z' is stopped. Thus, counter count $C_{60}$ is a measure of the entire execution duration of the two processes $P_{60}$, $P_{61}$. If counter count $C_{62}$ exceeds a value predefined by a maximum period of time $T_{Max}$, an overflow error message $F_1$ is output. If a malfunction occurs during a first process $P_{62}$ of a pair, then, starting with the starting point in time $t_{62}$ of this process $P_{62}$, the maximum period of time $T'_{Max}$ lapses until error signal $F'_1$ is output. This is undesirably long, in particular since the maximum period of time $T'_{Max}$ must be longer than two time intervals dT of the execution grid. In addition, process execution times that are too short, likewise pointing to a malfunction of the real-time system or of the processes, are not always able to be detected. In FIG. 9, both process $P_{66}$, as well as process $P_{69}$ are atypically short. If the too short process is the second process of a pair $P_{68}$, $P_{69}$, the counter Z' records a count $C_{68}$, which is shorter than predefined by the minimum period of time $T'_{min}$, and, as a consequence thereof, an underflow error signal $F'_2$ is output. However, if the too short process $P_{66}$ is the first of a pair $P_{66}$, $P_{67}$, then, due to the start of the second process in accordance with the time-slot pattern at point in time $t_{67}$, no count $C_{66}$ is recorded that is shorter than the corresponding minimal period of time $T'_{min}$.

SUMMARY OF THE INVENTION

A method is devised by the exemplary embodiment and/or exemplary method of the present invention which has the features described herein and is able to be implemented by the device having the features described herein. The method according to the present invention provides for every underflow and overflow to be recorded, a reaction time, measured from a start of a faulty process to the point of outputting of an error signal, being short.

The method according to the present invention for monitoring a process execution of a plurality of sequentially executed processes starts one of a plurality of timers in cyclic permutation when one of the processes is started, and outputs a first error signal when a period of time recorded by one of the timers exceeds a predefined maximum period of time.

One advantage of the exemplary embodiment and/or exemplary method of the present invention is that a malfunction of a process, i.e., an atypically long execution duration, causes a first timer, which had been started prior to the process by a preceding process, to overflow. For that reason, measured from the start of a process, the reaction time until the malfunction of the process is recognized, is shorter than the maximum period of time.

The option of starting a timer by a process and stopping it by the same process requires selecting a longer average maximum period of time than in the method according to the present invention.

This has to do with the typical outliers of the execution duration which occur in isolated instances and should not result in an outputting of the error message. For that reason, in the case that the timer is started and stopped by the same process or is restarted by the immediately following process, the maximum period of time must be greater than the execution duration of the typical outliers. In the method according to the present invention, it is assumed that N−1 processes are executed in the typical manner and, at most, that one single process is an outlier, N being the number of timers. Thus, the excess length of the outlier is distributed over N processes, and the average maximum period of time, in terms of one single process, is shorter than in the aforementioned method that is not in accordance with the exemplary embodiment and/or exemplary method of the present invention.

Advantageous further refinements of the method set forth in claim 1 and improvements thereto are indicated in the dependent claims.

One exemplary embodiment provides that, in response to the ending of a process, a recorded period of time of the timer be read out which is restarted by the next process to be executed, and that a second error signal be output when the period of time falls below a predefined minimal period of time. This method advantageously makes it possible for a malfunction of the process execution having an atypically short execution duration of a process to be recognized.

Another embodiment provides for a test datum to be transmitted to a started process for processing purposes and, upon termination of the process, for a third error signal to be output in response to a deviation of the processed test datum from a setpoint value. In one embodiment, a process is composed of subprocesses, and at least one subprocess executes an operation on the test datum which confirms the execution of this subprocess reproducibly by the processed test datum. This makes it possible to recognize whether all relevant subprocesses have been executed in which the processed test datum is compared to the setpoint value. Another embodiment provides for at least two subprocesses to execute mutually non-commutative operations on the datum, with the result that the execution of these subprocesses is able to be confirmed in the correct sequence by the processed test datum. It is a feature of mutually non-commutative operations that an operation in a different sequence on the test datum leads, for most test data, to different processed test data.

In accordance with one exemplary embodiment, two immediately successive processes are started at a minimal time interval. This makes it possible for processes to be regularly executed.

Another embodiment provides for the maximum period of time to be greater than a first product of the minimal time interval and for the number of timers to be smaller than the sum of the first product and of the minimal time interval.

Another embodiment provides for the minimal period of time to be greater than or equal to a second product of the minimal time interval and of the number of timers reduced by one.

In accordance with one specific embodiment of the present invention, a device for implementing the method includes a monitoring device which is connected to a processor device that executes the processes in order to receive a start signal from the control device when a process is started, and is configured to compare a transmitted period of time to the maximal period of time and, in response to exceeding of the same, to output an error signal via an interface; and includes at least two timers which are connected to a multiplexer of the monitoring device in order to be able to be cyclically restarted by a reset signal and are connected to an input of the monitoring device in order to transmit a recorded period of time to the monitoring device.

Another embodiment provides for the timers to have regressively operated counters which, in response to a restart, are set to a value that corresponds to the predefined maximal period of time. Another embodiment provides for the timer to be configured to enable the recorded period of time to be read out by the monitoring device and for the timer to be configured to be stoppable by a control signal.

Yet another embodiment provides for the monitoring device to have a comparator which compares the setpoint value to a test datum processed by the process and, in the case of a deviation, outputs a third error signal.

Exemplary embodiments of the present invention, as well as advantageous further refinements, are shown in the figures of the drawing and are explained in greater detail in the following description.

Although the exemplary embodiment and/or exemplary method of the present invention is described with reference to a monitoring of a process control by a real-time system, it is not limited thereto, but rather relates generally to methods for monitoring processes.

DETAILED DESCRIPTION

In the figures, like or functionally equivalent components are denoted by like reference numerals, provided that nothing is indicated to the contrary.

Figure 1:
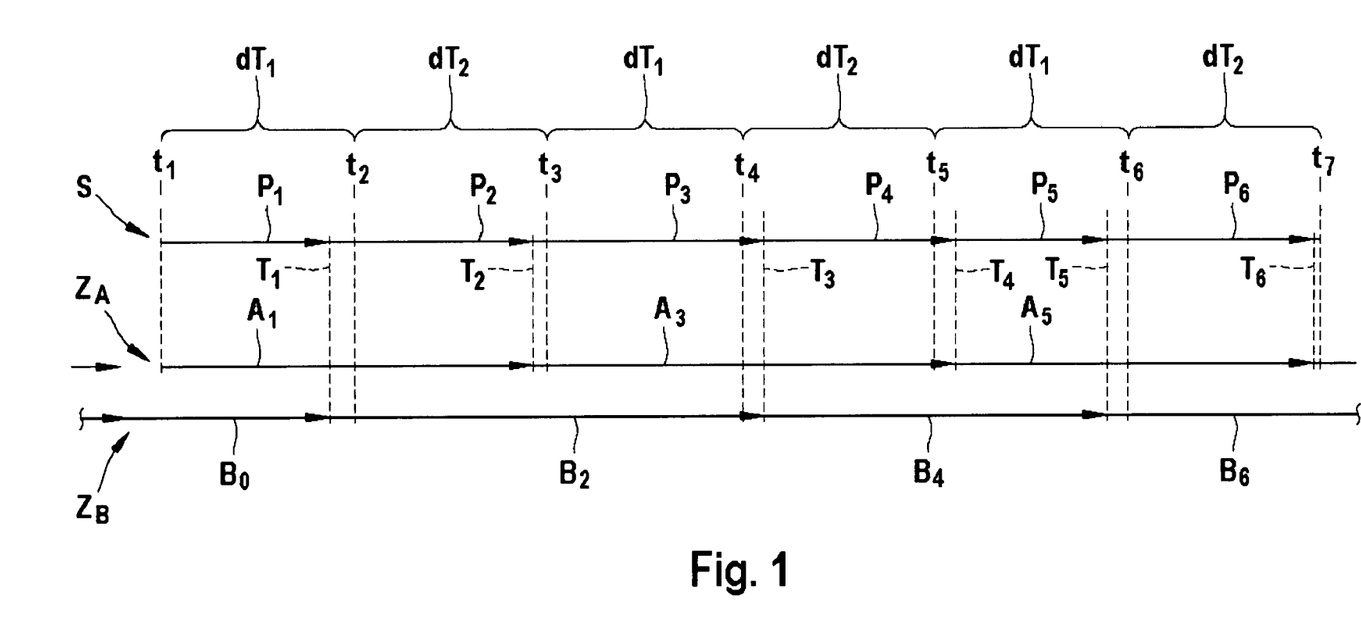
FIG. 1 shows a schematic representation of a specific embodiment, as a flow diagram.

FIG. 1 shows the execution in sequential order of a plurality of individual processes $P_1, P_2, \ldots$ by a processor system S. To the greatest degree possible, processor system S attempts to start each of the processes at predefined points in time $t_1, t_2, \ldots$, provided that a preceding process $P_3, P_4$ is not still active at predefined points in time $t_4, t_5$. In such a case, processor system S starts process $P_4, P_5$ instantaneously at point in time $T_3, T_4$ at which process $P_3, P_4$ is ended. The described processor system and the execution of the processes are typical for a real-time operating system and a corresponding device, as is frequently used in control systems. In most cases, time interval $dT_1, dT_2$ between two successive points in time $t_1, t_2, \ldots$ is equidistant. In another specific embodiment, time intervals $dT_1, dT_2$, as illustrated in FIG. 1, may differ and form pairs or longer sequences that are periodically repeated. With regard to the following descriptions, it is assumed that time intervals $dT_1, dT_2$ are equidistant, unless indicated otherwise.

Various malfunctions may occur during the process execution by processor system S. For that reason, it is desirable to obtain indicators of a malfunction of processor system S. A very simple and nevertheless effective method provides for monitoring the execution duration of processes $P_1, P_2, \ldots$. To that end, FIG. 1 shows a specific embodiment of the present invention that is used for monitoring two timers $Z_A, Z_B$. The two timers $Z_A, Z_B$ are alternatingly restarted when a new process $P_1, P_2, \ldots$ is started nearly simultaneously by processor system S. Thus, each timer $Z_A, Z_B$ is only restarted by every second process. In this connection, restarting is understood to mean that the timer is reset to a start value and begins to measure again. First timer $Z_A$ is started, together with first process $P_1$, at predefined point in time $t_1$. First timer $Z_A$ is restarted when third process $P_3$ is started at predefined point in time $t_3$. Second timer $Z_B$ is not influenced by the start of first process $P_1$ and of third process $P_3$, but rather is restarted together with second process $P_2$ started in between the aforementioned processes.

The period of time between two restarts of one of timers $Z_A, Z_B$ is read out prior to a restarting of corresponding timer $Z_A$. In the specific embodiment shown in FIG. 1, a timer $Z_A$ is stopped when second process $P_2$ is ended at point in time $T_2$. Thus, period of time $A_1$ recorded in this manner by timer $Z_A$ corresponds to the period of time between the start of first process $P_1$ and the end of second process $P_2$. In the illustrated example, second process $P_2$ is ended prior to third point in time $t_3$ at which third process $P_3$ is started, so that the reading out of first timer $Z_A$ at point in time $T_2$ does not coincide with the restarting of first timer $Z_A$ at predefined point in time $t_3$.

Another specific embodiment provides for only stopping timer $Z_A$ upon termination of a process and for reading out this timer before it is restarted. In the case of fourth process $P_4$, the point in time of reading out or of stopping of first timer $Z_A$ must necessarily coincide with the restarting of first timer $Z_A$, since fifth process $P_5$ is immediately started upon termination of fourth process $P_4$. The performance characteristics of second timer $Z_B$ correspond to that of first timer $Z_A$, with the exception that the process of reading out and restarting of second timer $Z_B$ is delayed by the execution time of a process.

This pattern may be applied universally to N timers $Z_A$, $Z_B, \ldots Z_N$, these timers then being started one after another in a cyclically permuted sequence, thus, following N-th timer $P_N$, first timer $Z_A$ is restarted again. Thus, first timer $Z_A$ is restarted in response to processes $P_1, P_{N+1}, P_{2N+1}, \ldots$; second timer $Z_B$ in response to processes $P_2, P_{N+2}, P_{2N+2}, \ldots$; and k-th timer $Z_N$ in response to processes $P_k, P_{N+k}, P_{2N+k}$. The reading out or stopping of a k-th timer $Z_k$ is carried out in accordance with the specific embodiment of FIG. 1 upon termination of process $P_{k-1}, P_{N+k-1}, P_{2N+k-1}$, which had been started prior to process $P_k, P_{N+k}, P_{2N+k}$, in response to which k-th timer $Z_k$ is restarted.

In FIG. 1, processes $P_3$ are shown whose execution duration is longer than time interval $dT_1$, that is made available for the processes. Time interval $dT_1$, $dT_2$ is exceeded in isolated instances when a process $P_3$ is required to carry out a greater number of calculations or individual steps than is otherwise customary. This may occur in an airbag control system, for example, which normally queries all sensors and, on the basis of a few calculations, is able to comprehend that a situation does not exist that would require airbag activation. In isolated instances, however, the sensors signal increased acceleration values, indicating the occurrence of an accident, and, accordingly, processor system S must perform a greater number of calculations in order to verify these signals and/or to activate the airbag. Since these situations and thus the long execution durations of the processes are very infrequent, time intervals $dT_1$, $dT_2$ are selected to enable processes $P_1, P_2, \ldots$ having a normal execution duration to be executed within these time intervals $dT_1$, $dT_2$, and, at the same time, for individual outliers to be compensated over a longer period of time or a plurality of processes, so that subsequent processes are again executed in accordance with the time schedule, as illustrated by the example of third process $P_3$ having excess length and by the subsequent sixth process $P_6$, which is executed in conformance with the time schedule at point in time $t_6$.

It follows from the preceding description that not every instance of a process execution exceeding a time interval $dT_1$, $dT_2$ is based on a malfunction of processor system S or of executed process $P_3$, but rather may also correspond to infrequently occurring outliers of the execution duration. For this purpose, a time buffer $\Delta T$ is introduced which corresponds to the expected excess length of the outliers. Since it is to be assumed that a typical outlier is very rare and thus only occurs once in 2 or N successive processes $P_1, P_2, \ldots$, a maximum period of time $T_{Max}$ is defined that is longer by time buffer $\Delta T$ than 2-times or N-times time interval dT. Generally, maximum period of time $T_{Max}$ is longer by the time buffer than the sum calculated over all time intervals $dT_1$, $dT_2$ between two scheduled starts of a timer.

Figure 2:
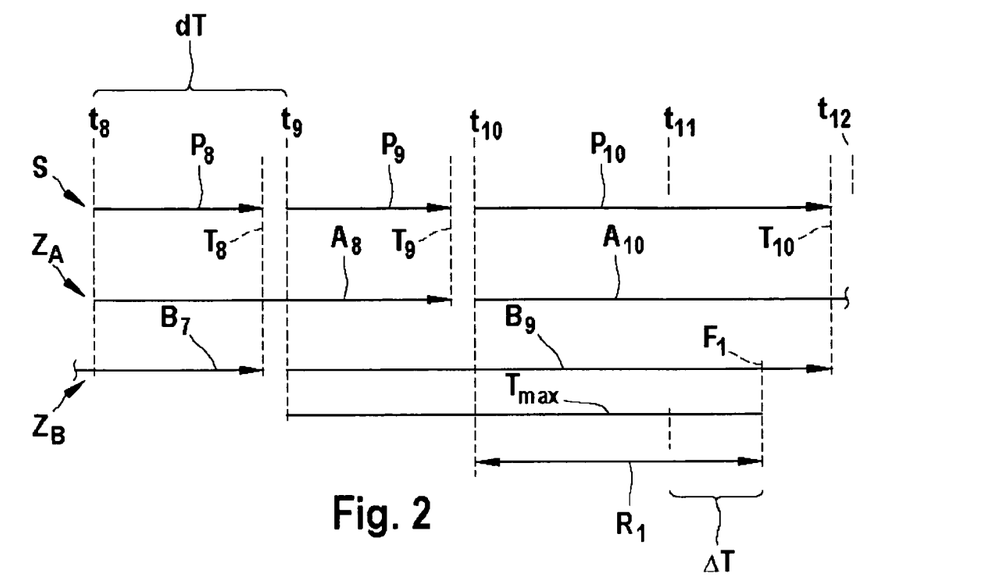
FIG. 2 shows a schematic representation of a specific embodiment, as a flow diagram.

It is explained exemplarily with reference to FIG. 2 how, on the basis of a predefined maximum period of time $T_{Max}$ and the periods of time recorded by timers $Z_A$, $Z_B$, a malfunction is recognized in the execution of processes. Eighth and ninth processes $P_8$, $P_9$ are executed without any malfunction being experienced by processor device S. Analogously to the explanations regarding FIG. 1, in response to the start of ninth process $P_9$, second timer $Z_B$ is started, and period of time $B_9$ is recorded by second timer $Z_8$. In conformance with the time schedule, tenth process $P_{10}$ is started at point in time $t_{10}$, a malfunction occurring during execution thereof, for example an endless loop within tenth process $P_{10}$ or a hardware defect of processor system S, which leads to an atypically long execution time of tenth processor $P_{10}$. In response to tenth process $P_{10}$ first timer $Z_A$ was also started. Both the first, as well as second timer $Z_A$, $Z_B$ monitor periods of time $A_{10}$ or $B_9$ recorded by the same. The monitoring of timers $Z_A$, $Z_B$ may also be undertaken by an external unit. If one of recorded periods of time $A_{10}$, $B_9$ exceeds predefined maximum period of time $T_{Max}$, an error signal is generated. The signal may be generated as closely in time as possible to point in time $F_1$ of the beginning of exceedance in time of maximum period of time $T_{Max}$. If maximum periods of time $T_{Max}$ for the two timers $Z_A$, $Z_B$ are selected to not differ too greatly (normally they are the same), recorded period of time $B_9$ of second timer $Z_B$ first exceeds maximum period of time $T_{Max}$, since this second timer $Z_B$ was started already prior to tenth process $P_{10}$. From this, it follows that reaction time $R_1$, measured from the beginning of the start of tenth process $P_{10}$ at which a malfunction occurs, until the point when the malfunction is recognized at point in time $F_1$, is shorter by one or N-1 times the time interval dT than maximum period of time $T_{Max}$. Thus, resultant reaction time $R_1$ is the sum of a time interval dT and of time buffer $\Delta T$. This makes it possible for a malfunction of processor system S or of the executed process to be quickly reacted to. In this case, in the context of an airbag control system, one specific embodiment of the present invention provides for an output stage to be blocked, so that a potentially erroneously generated control signal of the airbag control device is not able to activate an airbag.

Figure 7:
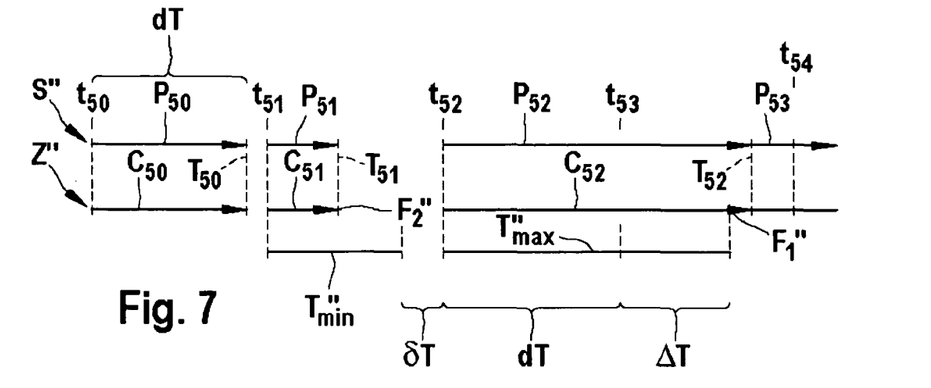
FIG. 7 shows a flow diagram for clarifying a problem definition underlying a specific embodiment of the exemplary embodiment and/or exemplary method of the present invention.

In a comparison with FIG. 7, it becomes apparent that the method according to the present invention reacts just as quickly to a malfunction of a process as when a monitoring system having one single timer Z'' is used that is restarted in response to each process $P_{50}, P_{51}, \ldots$. During process $P_{52}$, a malfunction occurs in processor system S'', which, in response to the exceedance of a maximum period of time $T''_{Max}$, is ascertained at point in time $F''_1$ due to the maximum period of time $T''_{Max}$ corresponding to the sum of time interval dT and of time buffer $\Delta T$. Thus, reaction time $R_1$ of the specific embodiment described in the preceding and of this system are equal.

Figure 3:
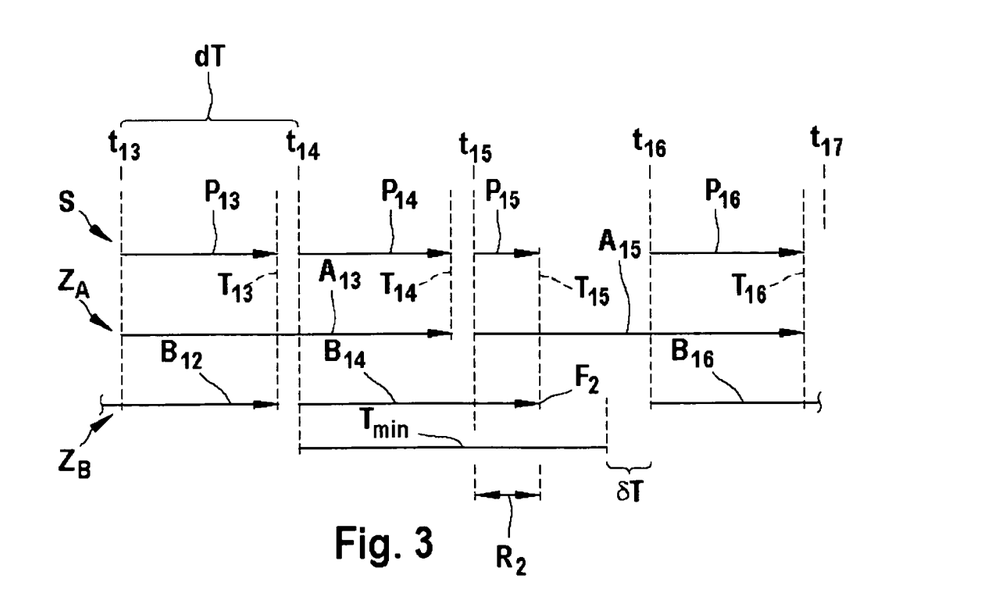
FIG. 3 shows a schematic representation of the specific embodiment for clarifying an overflow.

Another indication of a malfunction in a processor system S is when processes are ended much more quickly than usual. It is described with reference to FIG. 3 how such a malfunction is ascertained with the aid of a minimal period of time $T_{min}$. Thirteenth and fourteenth processes $P_{13}$, $P_{14}$ are executed and terminated in accordance with the time schedule. Second timer $Z_B$ is started together with fourteenth process $P_{14}$. Fifteenth process $P_{15}$ is started together with first timer $Z_A$. During fifteenth process $P_{15}$, a malfunction arises, which, for example, prematurely ends the execution of fifteenth process $P_{15}$. At the end of this fifteenth process, second timer $Z_B$ is stopped in the usual manner, and period of time $B_{14}$ recorded by the same is read out. This period of time $B_{14}$ is compared to minimal period of time $T_{min}$. If recorded period of time $B_{14}$ falls below minimum period of time $T_{min}$, a second error signal is output. The error signal may be output at point in time $F_2$ as closely in time as possible to the reading out of second timer $Z_B$. Minimum period of time $T_{min}$ is shorter by a time difference $\delta T$ than twice time interval dT. All previous considerations regarding time buffer $\Delta T$ for maximum period of time $T_{Max}$ are applicable to minimum period of time $T_{min}$, with the difference that minimum period of time $T_{min}$ is shorter by time difference $\delta T$ than twice or N-times time interval dT.

Besides monitoring the processes on the basis of their execution times, another possible diagnostic method is provided by the specific embodiment illustrated with reference to FIG. 4.

If, in a processor system S, a first process $P_1$ is started at 200, processor control S transmits a start signal 100 to a monitoring device 2. In response thereto, monitoring device 2 starts a first timer $Z_A$ at 250, as described in the preceding exemplary embodiments. In addition, a test datum $X_1$ is selected at 251 and transmitted via a signal 101 to processor system S. In first process $P_1$, at least one operation f is applied to test datum $X_1$ at 201, so that a processed test datum $Y_1$ is thereby obtained. At termination 202 of first process $P_1$, a stop signal 102 is transmitted from processor system S to monitoring device 2. Subsequently, in monitoring device 2, second timer $Z_B$ is stopped at 252, in order to check whether period of time B recorded by second timer $Z_B$ falls below minimal period of time $T_{min}$ at 254; and, if it has, an error message is output at 259, as already described in the preceding specific embodiments. In addition, processed test datum $Y_1$, which was transmitted via stop signal 102, is compared to a setpoint value $Y_{setpoint1}$. In the case of a deviation, an error message is likewise output. In addition, it is checked whether a recorded period of time has not already exceeded maximum period of time $T_{Max}$ at 258, which likewise leads to the outputting of an error message, as already explained.

Figure 4:
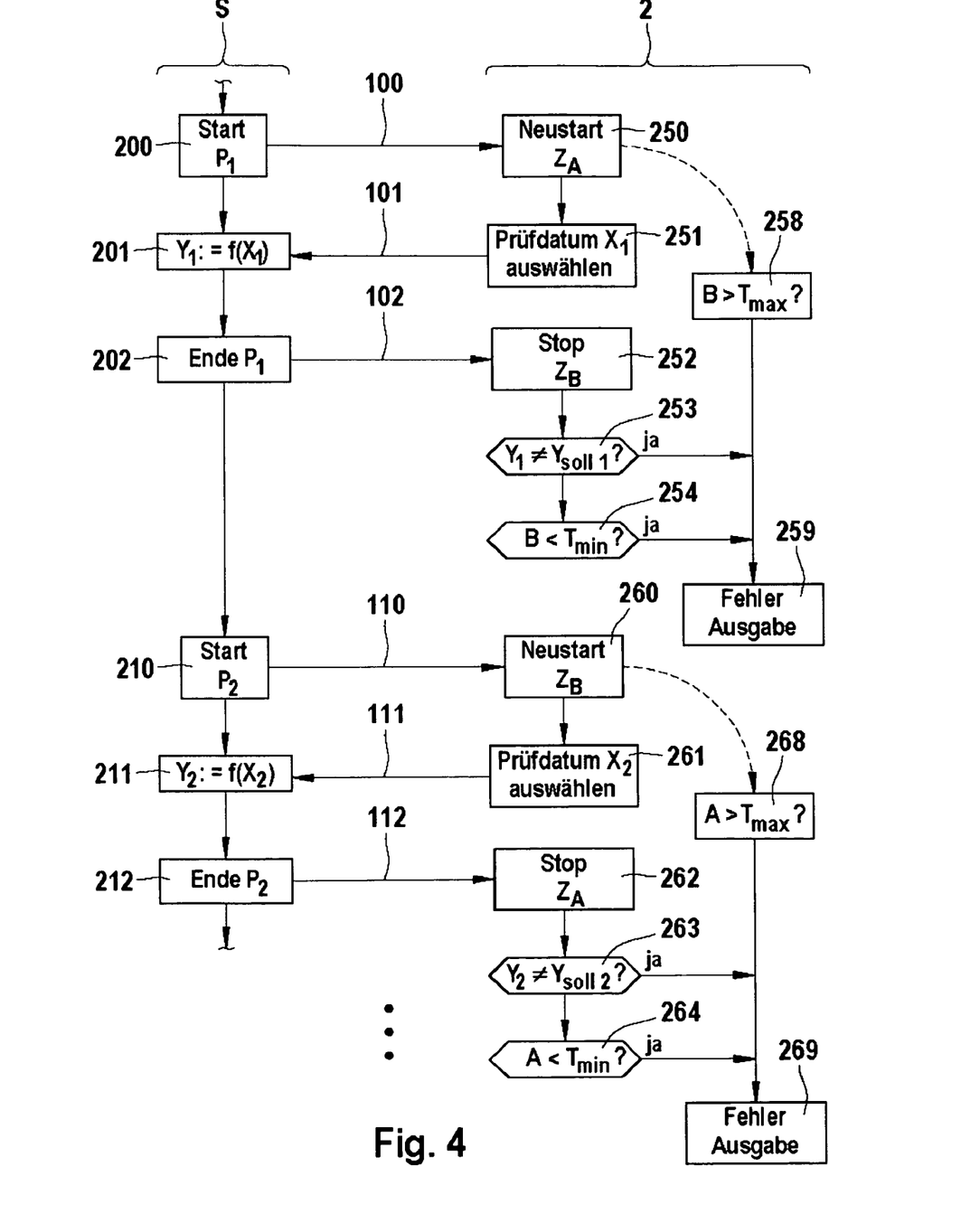
FIG. 4 shows a schematic representation of the specific embodiment in the case of an underflow.

At the start of another process, the previously described steps are repeated, as can be inferred from FIG. 4, the other timer being started or stopped accordingly. By using various test data $X_1, X_2, \ldots$, it may be ensured that the operations are executed on test data $X_1, X_2, \ldots$ and that the process does not only read out one single previously processed test datum $Y_1$, $Y_2, \ldots$ from one memory cell of processor system S. Test data $X_1, X_2, \ldots$ may be cyclically used again. For every test datum $X_1, X_2, \ldots$, corresponding setpoint values $Y_{setpoint1}$, $Y_{setpoint2}, \ldots$ are to be reserved (held ready) in monitoring device 2.

Figure 5:
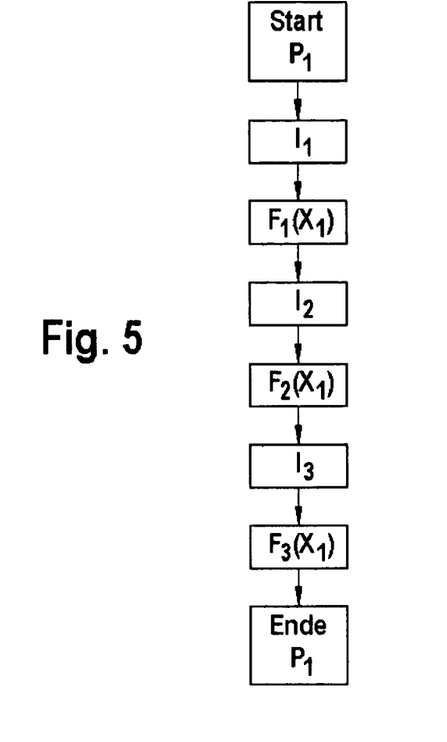
FIG. 5 shows a flow diagram of a specific embodiment having a multi-step process.

With reference to FIG. 5, two applications of a test datum are described. Typically, one single process may be subdivided into a plurality of subprocesses. In the context of an airbag control, these would include readout sensors $I_1$, analyzing sensor values 12, and generating a control signal for airbag system 13, for example. In this connection, it is absolutely necessary for the correct execution of process $P_1$ that all subprocesses $I_1, I_2, I_3$ be executed. To this end, every subprocess $I_1, I_2, I_3$ subsequently executes an operation F on test datum $X_1$. Three very simple operations $F_1, F_2, F_3$ would entail negating the first, the second and, respectively, the third bit of test datum $X_1$. Thus, by making a comparison to the setpoint value, it is possible to directly ascertain whether all three operations were executed or if one, and in this case even which one, of the operations was not executed. Important for the correct execution of process $P_1$ is also the sequence of executions of subprocesses $I_1, I_2, I_3$. This may be accomplished in that operations $F_1, F_2, F_3$ are mutually or at least partially non-commutative. As a result, an incorrect sequence of the execution yields a processed test datum Y that differs from the setpoint value. Assuming, for example, test datum $X_1$ is five and operation $F_1$ is multiplication by two and operation $F_2$ is addition by three, a correct sequence yields the result thirteen, which in this case is the setpoint value, and a permuted sequence yields the result sixteen, which does not correspond to the setpoint value.

Figure 6:
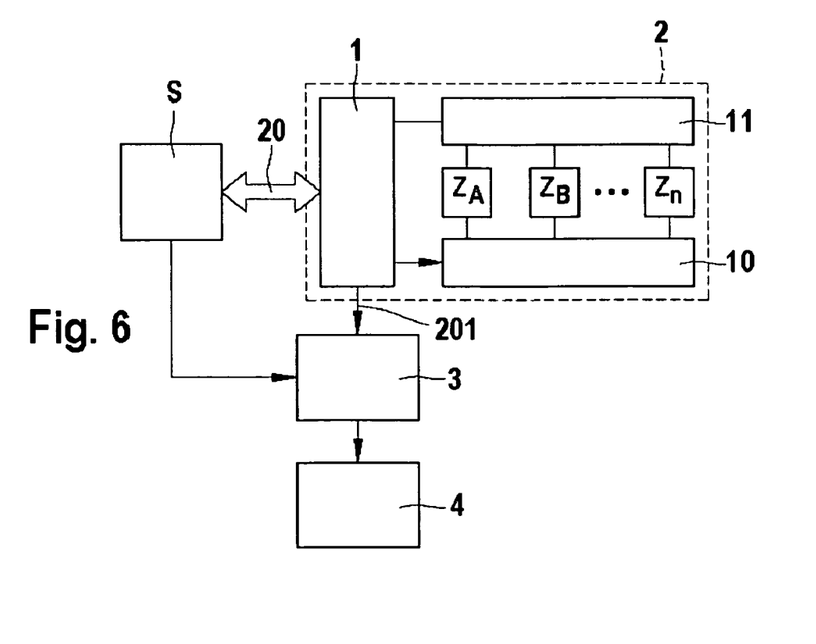
FIG. 6 shows a schematic block diagram of a specific embodiment of the device according to the exemplary embodiment and/or exemplary method of the present invention.

With reference to FIG. 6, a monitoring device 2 is described which has an interface and a processing module 1 that is linked to a processor system S via a data and control line 20 and to an output stage 3 of an airbag system 4 in order to transmit a suppression signal 201. Suppression signal 201 is generated by processing device 1 when a malfunction of the process execution is ascertained by processor system S using one of the methods described above. Processing device 1 is capable of restarting and, if indicated, also of stopping a multiplicity of timers $Z_A, Z_B, Z_N$ directly or via a multiplexer device 10. In one exemplary embodiment, timers $Z_A, Z_B, Z_N$ are down counters which count down in time with a timer. If a count of one of the counters reaches value 0, then this triggers an interrupt in a cell readout device 11. When they are restarted, counters $Z_A, Z_B, Z_N$, are set to a value that corresponds to the maximum period of time. As a result, the triggering of the previously mentioned interrupt is interpreted as an error in processor system S during the process execution. In another variant, counter readout device 11 may read out the count of the counters or of timer $Z_A, Z_B, Z_N$ and, when prompted, transfer this value to processing device 1. Readout device 11 may likewise be linked to a multiplexer which is configured to only allow that timer to be read out which has been running for the longest period of time. This may be implemented by employing a simple cyclical multiplexer.

Control device S outputs a control signal to output stage 3 when airbag system 4 is to be triggered. When an error of the process execution is recognized by processing device 1, output stage 3 is blocked, thereby preventing a triggering of airbag system 4.

Another advantage of the described specific embodiments is achieved in accordance with the following. As described, the outliers require introduction of time buffer $\Delta T$. In the context of a system having N timers $Z_1, Z_2, \ldots$, time buffer $\Delta T$ is effectively distributed over N processes $P_1, P_2 \ldots$. Thus, the average execution duration for each individual process is specified more precisely than when working with only one single timer Z" and, nevertheless, isolated outliers do not lead to the outputting of an error signal.

What is claimed is:

1. A method for monitoring a processor system, the method comprising:
executing a plurality of processes, one of the processes being started after a preceding one of the processes is ended, wherein one of at least two timers is restarted in cyclic permutation when one of the processes is started; and
outputting a first error signal when a period of time recorded by one of the at least two timers exceeds a predefined maximum period of time;
wherein, in response to an ending of a process, a recorded period of time of a corresponding timer, which is restarted by a next process to be executed, is read out, and wherein a second error signal is output when a recorded period of time falls below a predefined minimal period of time.

2. The method of claim 1, wherein one of the processes is started, at the earliest, following a predefined time interval that has elapsed since the start of another of the processes that was started immediately prior to the one of the processes.

3. The method of claim 2, wherein:
a length of the maximum period of time is defined by N $dT < T_{Max} < (N+1) \, dT$;
$T_{Max}$ is the maximum period of time;
dT is the predefined time interval;
N is a number of the timers;
N dT is a first product of the predefined time interval and of the number of timers; and
(N+1) dT is a sum of the first product and of the predefined time interval.

4. A method for monitoring a processor system, the method comprising:
executing a plurality of processes, one of the processes being started after a preceding one of the processes is ended, wherein one of at least two timers is restarted in cyclic permutation when one of the processes is started; and outputting a first error signal when a period of time recorded by one of the at least two timers exceeds a predefined maximum period of time;

wherein a test datum is transmitted for processing to a started process, and wherein upon termination of the process, a second error signal is output in response to a deviation of the processed test datum from a setpoint value.

5. The method of claim 4, wherein a process includes subprocesses, and at least one of the subprocesses executes an operation on the test datum which confirms an execution of the at least one of the subprocesses reproducibly by the processed test datum.

6. The method of claim 5, wherein at least two subprocesses execute mutually non-commutative operations on the test datum, so that the execution of the at least two subprocesses in a correct sequence is able to be confirmed by the processed test datum.

7. The method of claim 4, wherein one of the processes is started, at the earliest, following a predefined time interval that has elapsed since the start of another of the processes that was started immediately prior to the one of the processes.

8. The method of claim 7, wherein:
a length of the maximum period of time is defined by N $dT < T_{Max} < (N+1)\, dT$;
$T_{Max}$ is the maximum period of time;
dT is the predefined time interval;
N is a number of the timers;
N dT is a first product of the predefined time interval and of the number of timers; and
(N+1) dT is a sum of the first product and of the predefined time interval.

9. A method for monitoring a processor system, the method comprising:
executing a plurality of processes, one of the processes being started after a preceding one of the processes is ended, wherein one of at least two timers is restarted in cyclic permutation when one of the processes is started; and
outputting a first error signal when a period of time recorded by one of the at least two timers exceeds a predefined maximum period of time;
wherein:
one of the processes is started, at the earliest, following a predefined time interval that has elapsed since the start of another of the processes that was started immediately prior to the one of the processes;
a second error signal is output when a recorded period of time falls below a predefined minimal period of time;
the minimal period of time is greater than or equal to (N−1) dT;
dT is the predefined time interval; and
N is a of the number of the timers.

10. The method of claim 9, wherein:
a length of the maximum period of time is defined by N $dT < T_{Max} < (N+1)\, dT$;
$T_{Max}$ is the maximum period of time;
N dT is a first product of the predefined time interval and of the number of timers; and
(N+1) dT is a sum of the first product and of the predefined time interval.

11. A device for monitoring a processor system, comprising:
a monitoring device, which is linked to the processor system to receive a start signal from the processor system when a process is started;
at least two timers connected to a multiplexer of the monitoring device to cyclically restart the timers using a reset signal, and which are connected to an input of the monitoring device to transmit a recorded period of time to the monitoring device;
wherein:
a plurality of the processes are executed, one of the processes being started after a preceding one of the processes is ended;
one of at least two timers is restarted in cyclic permutation when one of the processes is started;
a first error signal is outputted when a period of time recorded by one of the at least two timers exceeds a predefined maximum period of time; and
the monitoring device has a comparator to compare a setpoint value to a test datum processed by the process, and to output a second error signal for a deviation.

12. The device of claim 11, wherein the timers are regressively operated counters which, in a restart, are set to a value that corresponds to the predefined maximal period of time.

13. The device of claim 12, wherein the input is configured to trigger an output of the first error message when a zero of one of the counters is present at the input.

14. The device of claim 11, wherein the count of the counters is able to be read out by the monitoring device, and the timer is configured to be stoppable by a control signal.

15. The device of claim 11, wherein a process includes subprocesses, and at least one of the subprocesses executes an operation on the test datum which confirms an execution of the at least one of the subprocesses reproducibly by the processed test datum.

16. The device of claim 15, wherein at least two subprocesses execute mutually non-commutative operations on the test datum, so that the execution of the at least two subprocesses in a correct sequence is able to be confirmed by the processed test datum.

17. The device of claim 11, wherein:
one of the processes is started, at the earliest, following a predefined time interval that has elapsed since the start of another of the processes that was started immediately prior to the one of the processes;
a length of the maximum period of time is defined by N $dT < T_{Max} < (N+1)\, dT$;
$T_{Max}$ is the maximum period of time;
dT is the predefined time interval;
N is a number of the timers;
N dT is a first product of the predefined time interval and of the number of timers; and
(N+1) dT is a sum of the first product and of the predefined time interval.

18. A device for monitoring a processor system, comprising:
a monitoring device, which is linked to the processor system to receive a start signal from the processor system when a process is started;
at least two timers connected to a multiplexer of the monitoring device to cyclically restart the timers using a reset signal, and which are connected to an input of the monitoring device to transmit a recorded period of time to the monitoring device;
wherein:
a plurality of the processes are executed, one of the processes being started after a preceding one of the processes is ended;
one of at least two timers is restarted in cyclic permutation when one of the processes is started;

a first error signal is outputted when a period of time recorded by one of the at least two timers exceeds a predefined maximum period of time;

in response to an ending of a process, a recorded period of time of a corresponding timer, which is restarted by a next process to be executed, is read out; and a second error signal is output when a recorded period of time falls below a predefined minimal period of time.

19. A device for monitoring a processor system, comprising:

a monitoring device, which is linked to the processor system to receive a start signal from the processor system when a process is started;

at least two timers connected to a multiplexer of the monitoring device to cyclically restart the timers using a reset signal, and which are connected to an input of the monitoring device to transmit a recorded period of time to the monitoring device;

wherein:

a plurality of the processes are executed, one of the processes being started after a preceding one of the processes is ended;

one of at least two timers is restarted in cyclic permutation when one of the processes is started;

a first error signal is outputted when a period of time recorded by one of the at least two timers exceeds a predefined maximum period of time;

one of the processes is started, at the earliest, following a predefined time interval that has elapsed since the start of another of the processes that was started immediately prior to the one of the processes;

a second error signal is output when a recorded period of time falls below a predefined minimal period of time;

the minimal period of time is greater than or equal to $(N-1)\, dT$;

dT is the predefined time interval; and

N is a of the number of the timers.

20. A method for monitoring a processor system, the method comprising:

sequentially executing a plurality of processes, a predefined time interval dT being assigned to each of the plurality of processes such that, for each respective one of the processes, a process to be executed following the respective process is not started at least until lapse of the predefined time interval measured from a start of execution of the respective process;

restarting a first of a plurality of timers upon a respective start of each of a first subset of the sequentially executed plurality of processes and not upon a respective start of any of a second subset of the sequentially executed plurality of processes;

restarting a second of the plurality of timers upon the respective start of each of the second subset of the sequentially executed processes and not upon the respective start of any of the first of the sequentially executed plurality of processes; and outputting an error signal when a period of time recorded by one of the first and second timers exceeds a predefined maximum period of time;

wherein:

for each of the plurality of timers, after the respective timer is restarted upon the respective start of one of the respective subset of the sequentially executed plurality of processes upon start of which the respective timer is configured to be restarted, where an error does not occur, the respective timer is restarted only after successive execution of a number of the sequentially executed plurality of processes at least equal to a number N of the plurality of timers configured to be restarted upon each respective start of a respective subset of the plurality of processes; and a length of the maximum period of time $T_{Max}$ is defined by $(N*dT)<T_{Max}<((N+1)*dT)$.

21. A method for monitoring a processor system, the method comprising:

sequentially executing a plurality of processes, a predefined time interval dT being assigned to each of the plurality of processes such that, for each respective one of the processes, a process to be executed following the respective process is not started at least until lapse of the predefined time interval measured from a start of execution of the respective process;

restarting a first of a plurality of timers upon a respective start of each of a first subset of the sequentially executed plurality of processes and not upon a respective start of any of a second subset of the sequentially executed plurality of processes;

restarting a second of the plurality of timers upon the respective start of each of the second subset of the sequentially executed processes and not upon the respective start of any of the first of the sequentially executed plurality of processes; and outputting an error signal when a period of time recorded by one of the first and second timers is less than a predefined minimal period of time;

wherein:

for each of the plurality of timers, after the respective timer is restarted upon the respective start of one of the respective subset of the sequentially executed plurality of processes upon start of which the respective timer is configured to be restarted, where an error does not occur, the respective timer is resstarted only after successive execution of a number of the sequentially executed plurality of processes at least equal to a number N of the plurality of timers configured to be restarted upon each respective start of a respective subset of the plurality of processes; and a length of the minimal period of time $T_{Min}$ is defined by $((N-1)*dT) \geq T_{Min}$.

* * * * *